(12) United States Patent
Wang et al.

(10) Patent No.: US 12,355,069 B2
(45) Date of Patent: Jul. 8, 2025

(54) SECONDARY BATTERY, PROCESS FOR PREPARING SAME, AND APPARATUS COMPRISING SECONDARY BATTERY

(71) Applicant: CONTEMPORARY AMPEREX TECHNOLOGY (HONG KONG) LIMITED, Hong Kong (CN)

(72) Inventors: Yuwen Wang, Ningde (CN); Baozhen Wu, Ningde (CN); Yonghuang Ye, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 800 days.

(21) Appl. No.: 17/547,228

(22) Filed: Dec. 10, 2021

(65) Prior Publication Data
US 2022/0102708 A1 Mar. 31, 2022

Related U.S. Application Data

(63) Continuation of application No. PCT/CN2020/088464, filed on Apr. 30, 2020.

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/386* (2013.01);
(Continued)

(58) Field of Classification Search
CPC .... H01M 4/366; H01M 4/0404; H01M 4/386; H01M 4/505; H01M 4/525; H01M 4/587;
(Continued)

(56) References Cited

U.S. PATENT DOCUMENTS

| | | | |
|---|---|---|---|
| 2013/0224584 A1* | 8/2013 | Sung | H01M 4/13 429/211 |
| 2016/0285101 A1 | 9/2016 | Yoshio et al. | |

(Continued)

FOREIGN PATENT DOCUMENTS

| | | |
|---|---|---|
| CN | 102956877 A | 3/2013 |
| CN | 106797020 A | 5/2017 |

(Continued)

OTHER PUBLICATIONS

Machine English translation of KR 10-2017-0109293 (Year: 2017).*
(Continued)

*Primary Examiner* — Michael L Dignan
(74) *Attorney, Agent, or Firm* — East IP P.C.

(57) ABSTRACT

The present application discloses a secondary battery, a process for preparing the same, and an apparatus including the secondary battery. The secondary battery includes a negative electrode plate, and the negative electrode plate includes a negative electrode current collector and a negative electrode film; the negative electrode film includes a first negative electrode coating layer and a second negative electrode coating layer; the first negative electrode coating layer is disposed on at least one surface of the negative electrode current collector and includes a first negative electrode active material, the first negative electrode active material includes graphite; the second negative electrode coating layer is disposed on a surface of the first negative electrode coating layer and includes a second negative electrode active material, and the second negative electrode active material includes artificial graphite and a silicon-based material.

18 Claims, 3 Drawing Sheets

(51) Int. Cl.
*H01M 4/38* (2006.01)
*H01M 4/505* (2010.01)
*H01M 4/525* (2010.01)
*H01M 4/587* (2010.01)
*H01M 10/0525* (2010.01)
*H01M 4/02* (2006.01)

(52) U.S. Cl.
CPC .......... *H01M 4/505* (2013.01); *H01M 4/525* (2013.01); *H01M 4/587* (2013.01); *H01M 10/0525* (2013.01); *H01M 2004/021* (2013.01); *H01M 2004/027* (2013.01); *H01M 2004/028* (2013.01); *H01M 2220/20* (2013.01)

(58) Field of Classification Search
CPC ....... H01M 10/0525; H01M 2004/021; H01M 2004/027; H01M 2004/028; H01M 2220/20; H01M 4/134; H01M 4/1393; H01M 4/1395; H01M 4/131; H01M 4/364; H01M 4/483; H01M 4/133; Y02P 70/50; Y02E 60/10
See application file for complete search history.

(56) References Cited

U.S. PATENT DOCUMENTS

| | | | | |
|---|---|---|---|---|
| 2016/0329557 | A1* | 11/2016 | Sugimori | H01M 4/483 |
| 2016/0351892 | A1 | 12/2016 | Sugimori et al. | |
| 2020/0176753 | A1* | 6/2020 | Lee | H01M 4/366 |
| 2020/0194796 | A1* | 6/2020 | Sun | H01M 4/625 |
| 2021/0013496 | A1* | 1/2021 | Tsuzuki | H01M 4/133 |
| 2024/0186492 | A1* | 6/2024 | Kim | H01M 10/052 |

FOREIGN PATENT DOCUMENTS

| | | | | | |
|---|---|---|---|---|---|
| CN | 107785535 | A | | 3/2018 | |
| CN | 109616614 | | * | 4/2019 | ............ H01M 4/133 |
| CN | 109616614 | A | | 4/2019 | |
| CN | 110148708 | A | | 8/2019 | |
| CN | 110867560 | A | | 3/2020 | |
| CN | 111261834 | A | | 6/2020 | |
| CN | 111771300 | A | | 10/2020 | |
| EP | 2559660 | A1 | | 2/2013 | |
| EP | 3654423 | A2 | | 5/2020 | |
| EP | 3667784 | A1 | | 6/2020 | |
| EP | 3751641 | A1 | | 12/2020 | |
| JP | 2005044775 | A | | 2/2005 | |
| JP | 2008186732 | A | | 8/2008 | |
| JP | 2013041826 | A | | 2/2013 | |
| JP | 2014067587 | A | | 4/2014 | |
| JP | 2014146471 | A | | 8/2014 | |
| JP | 2015018663 | A | | 1/2015 | |
| JP | 2015088450 | A | | 5/2015 | |
| JP | 2015537347 | A | | 12/2015 | |
| JP | 2017062911 | A | | 3/2017 | |
| KR | 10-2017-0109293 | | * | 9/2017 | ............ H01M 4/133 |
| KR | 20170109293 | A | | 9/2017 | |
| KR | 1020190076706 | A | | 7/2019 | |
| KR | 1020200012779 | A | | 2/2020 | |
| KR | 1020200038168 | A | | 4/2020 | |
| WO | 2016035289 | A1 | | 3/2016 | |
| WO | 2019035669 | A2 | | 2/2019 | |
| WO | 2019225534 | A1 | | 11/2019 | |
| WO | 2020071814 | A1 | | 4/2020 | |
| WO | WO 2020/071814 | | * | 4/2020 | ............ H01M 4/134 |

OTHER PUBLICATIONS

The first Office Action for Japanese Application No. 2022-532689, dated May 29, 2023, 14 pages.
The First Office Action for Chinese Application No. 202080005630.1, dated Jul. 26, 2023, 16 pages.
The Second Office Action for Japanese Application No. 2022-532689, dated Nov. 27, 2023, 14 pages.
The First Office Action for Korean Application No. 10-2022-7018608, dated Feb. 21, 2024, 11 pages.
The International search report for PCT Application No. PCT/CN2020/088464, dated Feb. 4, 2021, 7 pages.
The extended European search report for EP Application No. 20933096.8, dated Oct. 20, 2022, 10 pages.
The First Office Action for Indian Application No. 202217033012, dated Dec. 9, 2022, 5 pages.

* cited by examiner

ID continuation...

SECONDARY BATTERY, PROCESS FOR PREPARING SAME, AND APPARATUS COMPRISING SECONDARY BATTERY

CROSS-REFERENCE TO RELATED APPLICATIONS

This application is a continuation of International Application No. PCT/CN2020/088464, filed on Apr. 30, 2020, which is hereby incorporated by reference in its entirety.

TECHNICAL FIELD

This application belongs to the technical field of secondary batteries, and specifically relates to a secondary battery, a process for preparing the same, and an apparatus comprising the secondary battery.

BACKGROUND

Secondary batteries represented by lithium-ion batteries have the advantages such as high specific energy, long service life, and low cost, and therefore, have been widely used in the new energy industry. For example, with the increasingly prominent environmental and energy issues, there is an urgent need for the development of new energy electric vehicles, which brings opportunities to the secondary battery industry and also puts forward higher requirements for secondary batteries.

How to enable secondary batteries to have relatively good electrochemical performance and safety performance under the premise of relatively high energy density is the key challenge in the field of secondary batteries.

SUMMARY

In order to achieve the above objective, a first aspect of the present application provides a secondary battery, including a negative electrode plate, wherein the negative electrode plate includes a negative electrode current collector and a negative electrode film; the negative electrode film includes a first negative electrode coating layer and a second negative electrode coating layer; the first negative electrode coating layer is disposed on at least one surface of the negative electrode current collector and includes a first negative electrode active material, the first negative electrode active material includes graphite, and the first negative electrode active material includes or does not include a silicon-based material; the second negative electrode coating layer is disposed on a surface of the first negative electrode coating layer and includes a second negative electrode active material, and the second negative electrode active material includes artificial graphite and a silicon-based material; the silicon-based material is present at a mass percentage denoted as W1 in the first negative electrode active material, the silicon-based material is present at a mass percentage denoted as W2 in the second negative electrode active material, and the negative electrode plate satisfies: $W2 \geq W1$.

A second aspect of the present application provides a process for preparing a secondary battery, including preparing a negative electrode plate of the secondary battery by the following steps of:

forming a first negative electrode coating layer including a first negative electrode active material on at least one surface of a negative electrode current collector, wherein the first negative electrode active material includes graphite, and the first negative electrode active material includes or does not include a silicon-based material;

forming a second negative electrode coating layer including a second negative electrode active material on a surface of the first negative electrode coating layer, wherein the second negative electrode active material includes artificial graphite and a silicon-based material, wherein the silicon-based material is present at a mass percentage denoted as W1 in the first negative electrode active material, the silicon-based material is present at a mass percentage denoted as W2 in the second negative electrode active material, and the negative electrode plate satisfies: $W2 \geq W1$.

The third aspect of the present application provides an apparatus, including the secondary battery according to the first aspect of the present application or the secondary battery prepared by the process according to the second aspect of the present application.

Compared with the prior art, the present application includes at least the following beneficial effects:

It is surprisingly found that, in the secondary battery of the present application, the negative electrode plate includes a double-coating structure (that is, a first negative electrode coating layer close to a negative electrode current collector and a second negative electrode coating layer disposed on the first negative electrode coating layer), and both the first negative electrode coating layer and the second negative electrode coating layer include a specific negative electrode active material, which enable the secondary battery to have relatively good fast charging capability and cycle performance under the premise of relatively high energy density. More preferably, the secondary battery further has relatively high safety performance. The apparatus of the present application includes the secondary battery, and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art may obtain other drawings based on the drawings without creative work.

DETAILED DESCRIPTION

Figure 1:
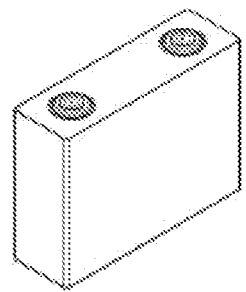
FIG. 1 is a schematic diagram of an embodiment of a secondary battery according to the present application.

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Secondary Battery

An embodiment in the first aspect of the present application provides a secondary battery. The secondary battery includes a positive electrode plate, a negative electrode plate and an electrolyte. During charging and discharging process of the battery, active ions are repeatedly intercalated and deintercalated between the positive electrode plate and the negative electrode plate. The electrolyte conducts ions between the positive electrode plate and the negative electrode plate.

[Negative Electrode Plate]

The negative electrode plate includes a negative electrode current collector and a negative electrode film; the negative electrode film includes a first negative electrode coating layer and a second negative electrode coating layer; the first negative electrode coating layer is disposed on at least one surface of the negative electrode current collector and includes a first negative electrode active material, the first negative electrode active material includes graphite, and the first negative electrode active material includes or does not include a silicon-based material; the second negative electrode coating layer is disposed on a surface of the first negative electrode coating layer and includes a second negative electrode active material, and the second negative electrode active material includes artificial graphite and a silicon-based material; the silicon-based material is present at a mass percentage denoted as $W1$ in the first negative electrode active material, the silicon-based material is present at a mass percentage denoted as $W2$ in the second negative electrode active material, and the negative electrode plate satisfies: $W2 \geq W1$.

The inventors found through a lot of research that, when the negative electrode plate of the secondary battery includes a double-coating structure, and both the first negative electrode coating layer and the second negative electrode coating layer include a specific negative electrode active material (the first negative electrode active material includes graphite and includes or does not include a silicon-based material, the second negative electrode active material includes artificial graphite and a silicon-based material, and the negative electrode plate satisfies $W2 \geq W1$), the negative electrode film can have a relatively high reversible capacity, the overall thickness of the negative electrode film is reduced, and the transmission path of active ions in the negative electrode film is shortened; meanwhile, the silicon-based material can provide a good action for supporting pores and channels during cold pressing of the electrode plate or cycle expansion of the battery, and the volume change of the silicon-based material during charging and discharging can further improve the structure of pores and channels on the outer layer of the negative electrode film, which enable the negative electrode plate to have and maintain a good structure of pores and channels for electrolyte infiltration and back flow, thereby improving the fast charging capability of the secondary battery and effectively improving cycle performance thereof. In addition, since both the first negative electrode coating layer and the second negative electrode coating layer include a specific negative electrode active material, the negative electrode can fully receive active ions from the positive electrode during fast charging of the battery to reduce the reduction precipitation phenomenon (such as lithium precipitation) of active ions on the surface of the negative electrode, which is beneficial to improving the fast charging performance of the battery and enables the battery to have relatively high cycle performance and safety performance.

Therefore, by the above optimization design on the negative electrode plate, the secondary battery using the same can have relatively good fast charging capability, cycle performance and safety performance under the premise of relatively high energy density.

In some preferred embodiments, the silicon-based material is present at a mass percentage $W2$ satisfying $0\% < W2 \leq 6\%$ in the second negative electrode active material, for example, $0\% < W2 \leq 5\%$, $0\% < W2 \leq 4\%$, $0\% < W2 \leq 3\%$, $0\% < W2 \leq 2\%$, etc. Specifically, $W2$ can be 0.5%, 1.0%, 1.2%, 1.4%, 1.5%, 1.6%, 1.8%, 2.0%, 2.5%, 3%, 5%, etc. The second negative electrode coating layer is made of artificial graphite with an appropriate amount of silicon-based material, which can improve the rapid lithium intercalation performance of the negative electrode film while reducing the volume expansion of the battery during cyclic charging and discharging and the side reaction of a negative electrode interphase, thereby further improving the energy density and cycle performance of the battery and enabling the secondary battery to have better energy density, fast charging capability and cycle performance. More preferably, $1\% \leq W2 \leq 3\%$. Most preferably, $1\% \leq W2 \leq 2\%$.

In some preferred embodiments, the silicon-based material is present at a mass percentage $W1$ satisfying $0\% \leq W1 \leq 5\%$ in the first negative electrode active material. For example, $0\% \leq W1 \leq 4\%$, $0\% \leq W1 \leq 3\%$, $0\% \leq W1 \leq 2\%$, $0\% \leq W1 \leq 1\%$, etc. Specifically, $W1$ can be 0%, 0.5%, 1%, 1.5%, 2%, 2.5%, 3%, 4%, etc. The inventors found through research, when the first negative electrode coating layer is made of graphite with an appropriate amount of silicon-based material, although the energy density of the battery can be further improved, the improvement on the fast charging capability is not obvious, and the cycle performance of the battery is affected to a certain extent. More preferably, 0%≤W1≤3%. Especially preferably, 0%≤W1≤2%. Most preferably, W1=0% (that is, the first negative electrode coating layer does not include the silicon-based material).

In some preferred embodiments, the mass percentage W1 of the silicon-based material in the first negative electrode active material and the mass percentage W2 of the silicon-based material in the second negative electrode active material satisfy W1+W2≤10%, and preferably W1+W2≤6%. More preferably, W1+W2≤3%. Especially preferably, 1%≤W1+W2≤3%. The W1+W2 within the given range can further balance the energy density, fast charging capability and cycle performance of the secondary battery.

After in-depth research, the inventors found that when the negative electrode plate of the secondary battery described in this application satisfies the above design, if the negative electrode active material further optionally satisfies one or more of the following design conditions, the performance of the secondary battery can be further improved.

The inventors found that the use of silicon-based materials with different particle sizes can further improve the performance of the battery. Specifically, the first negative electrode active material includes silicon-based materials with different particle sizes, and/or the second negative electrode active material includes silicon-based materials with different particle sizes. In some preferred embodiments, the silicon-based materials with different particle sizes include a first silicon-based material and a second silicon-based material, and the first silicon-based material has a particle size smaller than that of the second silicon-based material. The first silicon-based material with a relatively small particle size and the second silicon-based material with a relatively large particle size cooperate with each other to provide more active sites for the intercalation of active ions and shorten the diffusion path of active ions in the particles; in addition, the silicon-based materials cooperating with each other produce fewer new interphases due to volume changes, which reduces the problems of too thick solid electrolyte interphase (SEI) films and/or electrolyte consumption caused by the reaction of the electrolyte at new interphases, thereby further improving the fast charging capability, cycle performance and storage performance of the secondary battery.

Preferably, the first silicon-based material has a particle size of from 0.05 μm to 7 μm, and more preferably from 0.1 μm to 5 μm. The particle size of the first silicon-based material within the given range can further improve the fast charging capability of the secondary battery.

Preferably, the second silicon-based material has a particle size of from 7 μm to 15 μm, and more preferably from 8 μm to 12 μm. The particle size of the second silicon-based material within the given range can further improve the cycle performance and storage performance of the secondary battery.

In some embodiments, a weight ratio of the first silicon-based material to the second silicon-based material can be from 5:95 to 30:70, and preferably from 10:90 to 20:80.

In some embodiments, the silicon-based material can include one or more of an elemental silicon, a silicon-oxygen compound, a silicon-carbon composite, a silicon-nitrogen composite and a silicon alloy. Preferably, the silicon-based material includes a silicon-oxygen compound. The silicon-oxygen compound can satisfy a chemical formula $SiO_x$, where $0.6 \leq x < 2$. More preferably, $0.9 \leq x \leq 1.2$.

When both the first negative electrode active material and the second negative electrode active material include a silicon-based material, the silicon-based material in the first negative electrode active material and the silicon-based material in the second negative electrode active material can be the same or different.

When the silicon-based material includes the first silicon-based material and the second silicon-based material, the first silicon-based material and the second silicon-based material are each independently one or more selected from an elemental silicon, a silicon-oxygen compound, a silicon-carbon composite and a silicon alloy. Preferably, the first silicon-based material and the second silicon-based material each independently include a silicon-oxygen compound (such as the aforementioned $SiO_x$).

In some preferred embodiments, the artificial graphite is present at a mass percentage of ≥90%, more preferably ≥95%, still more preferably ≥97%, and particularly preferably ≥98% in the second negative electrode active material. The mass ratio of the artificial graphite in the second negative electrode active material within the given range enables the battery to have relatively high cycle performance.

In some preferred embodiments, the second negative electrode active material includes secondary particles, and the secondary particles have a quantity percentage of ≥50% in the second negative electrode active material. For example, the quantity percentage of the secondary particles in the second negative electrode active material can be from 50% to 95%, from 60% to 90%, from 70% to 95%, or from 80% to 90%, etc. Specifically, the quantity percentage of the secondary particles in the second negative electrode active material can be 50%, 60%, 70%, 80%, 90%, or etc. When the second negative electrode active material includes a certain content of secondary particles, the channels for deintercalated active ion in the second negative electrode coating layer can be increased, and the risk of reduction precipitation of active ions is further reduced, thereby further improving the fast charging performance and cycle performance of the battery. More preferably, the secondary particles have a quantity percentage of ≥70% in the second negative electrode active material.

Particularly preferably, in the second negative electrode active material, the artificial graphite includes secondary particles, and the silicon-based material mainly includes primary particles. The primary particles have a quantity percentage of from 80% to 100%, from 90% to 100%, from 95% to 100%, or from 98% to 100%, etc. in the silicon-based material.

In some embodiments, the graphite of the first negative electrode active material can include one or more of artificial graphite and natural graphite. Preferably, the graphite of the first negative electrode active material includes artificial graphite.

In some preferred embodiments, the artificial graphite is present at a mass percentage of ≥50%, more preferably from 60% to 100% in the first negative electrode active material. When the second negative electrode active material includes artificial graphite and a silicon-based material, and the first negative electrode active material of the first negative electrode coating layer includes more artificial graphite, the volume expansion of the negative electrode plate during the cycle can be further reduced, thereby further improving the cycle performance of the battery; meanwhile, the artificial graphite has relatively good thermal stability at a high temperature, which can effectively improve the safety performance of the battery during use. Specifically, the mass percentage of the artificial graphite in the first negative electrode active material can be 60%, 65%, 70%, 75%, 80%, 85%, 90% or 100%.

In some preferred embodiments, the first negative electrode active material includes primary particles, and the primary particles have a quantity percentage of ≥60% in the first negative electrode active material. For example, the quantity percentage of the primary particles in the first negative electrode active material can be from 60% to 100%, from 70% to 95%, from 80% to 100%, from 90% to 100%, etc. Specifically, the quantity percentage of the primary particles in the first negative electrode active material can be 70%, 75%, 80%, 85%, 90%, 95% or 100%. The first negative electrode active material preferably has a majority of primary particles, resulting in the battery having a relatively high capacity; meanwhile, the increase in the percentage of the primary particles can enhance the adhesion between the first negative electrode coating layer and the current collector, thereby further improving the cycle performance of the battery. More preferably, the quantity percentage of the primary particles in the first negative electrode active material is from 80% to 100%.

In some preferred embodiments, the first negative electrode active material has a volume average particle size $D_v50$ greater than that of the second negative electrode active material. The inventors found that, when the $D_v50$ of the first negative electrode active material is greater than that of the second negative electrode active material, it is beneficial to optimizing the structure of pores and channels in the first negative electrode coating layer and the second negative electrode coating layer, thereby further improving the fast charging performance of the battery; meanwhile, the optimization of the structure of pores and channels helps to reduce local polarization of the electrode, thereby further improving the cycle performance of the battery.

In some preferred embodiments, the $D_v50$ of the first negative electrode active material is from 12 μm to 18 μm, and more preferably from 13 μm to 17 μm.

In some preferred embodiments, the $D_v50$ of the second negative electrode active material is from 9 μm to 15 μm, and more preferably from 10 μm to 13 μm.

In the secondary battery of the present application, the first negative electrode active material and/or the second negative electrode active material can optionally include a certain amount of other commonly used negative electrode active materials, such as one or more of natural graphite, soft carbon, hard carbon, tin-based materials, and lithium titanate, in addition to the aforementioned negative electrode active materials of the present application. The tin-based material can be one or more selected from an elemental tin, a tin-oxygen compound, and a tin alloy.

All the negative electrode active materials used in the present application can be obtained through commercial channels. A person skilled in the art can make an appropriate choice according to the actual use environment.

In the secondary battery of the present application, the negative electrode film usually includes a negative electrode active material, an optional binder, an optional conductive agent, and other optional auxiliary agents, and is usually formed by coating with and drying a negative electrode slurry. The negative electrode slurry is usually formed by dispersing the negative electrode active material and optional conductive agent and binder and the like in a solvent and stirring uniformly. The solvent can be N-methylpyrrolidone (NMP) or deionized water.

As an example, the conductive agent can include one or more of superconducting carbon, acetylene black, carbon black, Ketjen black, carbon dots, carbon nanotubes, graphene and carbon nanofibers.

As an example, the binder can include one or more of styrene-butadiene rubber (SBR), water-soluble unsaturated resin SR-1B, water-based acrylic resin, polyvinyl alcohol (PVA), sodium alginate (SA) and carboxymethyl chitosan (CMCS).

Other optional auxiliary agents are, for example, a thickener (such as sodium carboxymethyl cellulose CMC-Na), a PTC thermistor material, etc.

After in-depth research, the inventors also found that when the negative electrode plate of the secondary battery described in this application satisfies the above design conditions, if the negative electrode film further optionally satisfies one or more of the following design conditions, the performance of the secondary battery can be further improved.

In some preferred embodiments, the negative electrode film has an areal density of from 8 $mg/cm^2$ to 13 $mg/cm^2$, and more preferably from 9 $mg/cm^2$ to 12.5 $mg/cm^2$. It should be noted that the areal density of the negative electrode film refers to an areal density of the entire negative electrode film (that is, a sum of areal densities of the first negative electrode coating layer and the second negative electrode coating layer).

In some preferred embodiments, an areal density ratio of the first negative electrode coating layer to the second negative electrode coating layer is from 2:3 to 3:2, such as from 4:5 to 5:4. When the areal density ratio of the first negative electrode coating layer to the second negative electrode coating layer is within the given range, the secondary battery can have better energy density, fast charging capability and cycle performance at the same time.

In some preferred embodiments, the negative electrode film has a compaction density of from 1.4 $g/cm^3$ to 1.7 $g/cm^3$; and more preferably, the negative electrode film has a compaction density of from 1.5 $g/cm^3$ to 1.65 $g/cm^3$. It should be noted that the compaction density of the negative electrode film refers to a compaction density of the entire negative electrode film (that is, a ratio of the areal density to the thickness of the negative electrode film). The compaction density of the negative electrode film within the given range enables the negative electrode plate to have relatively high reversible capacity and good low cycle expansion performance and dynamic performance, thereby further improving the energy density, fast charging capability and cycle performance of the battery.

In some preferred embodiments, the second negative electrode coating layer has a porosity greater than that of the first negative electrode coating layer. The second negative electrode coating layer with larger porosity cooperates with the first negative electrode coating layer with smaller porosity, which can further improve the fast charging performance and cycle performance of the battery.

In some preferred embodiments, the porosity of the first negative electrode coating layer is preferably from 15% to 35%, and more preferably from 20% to 30%.

In some preferred embodiments, the porosity of the second negative electrode coating layer is preferably from 20% to 40%, and more preferably from 25% to 35%.

In some preferred embodiments, a thickness ratio of the first negative electrode coating layer to the second negative electrode coating layer is from 4:6 to 7:3, and more preferably from 5:5 to 5:3. The thickness ratio of the first negative electrode coating layer to the second negative electrode coating layer within the given range enables the secondary battery to have better energy density, fast charging capability and cycle performance at the same time.

In some preferred embodiments, the negative electrode film can have a thickness of from 60 μm to 90 μm, and more preferably from 65 μm to 80 μm. The thickness of the negative electrode film is a sum of thicknesses of the first negative electrode coating layer and the second negative electrode coating layer.

In the secondary battery of the present application, the negative electrode current collector can be a metal foil or a composite current collector (a metal material can be disposed on a polymer substrate to form the composite current collector). As an example, a copper foil can be used as the negative electrode current collector.

In the secondary battery of the present application, the negative electrode film can be disposed on one surface of the negative electrode current collector, or on two surfaces of the negative electrode current collector. For example, the negative electrode current collector has two opposite surfaces in its own thickness direction, and the negative electrode film is disposed on either or both of the two opposite surfaces of the negative electrode current collector.

Figure 2:
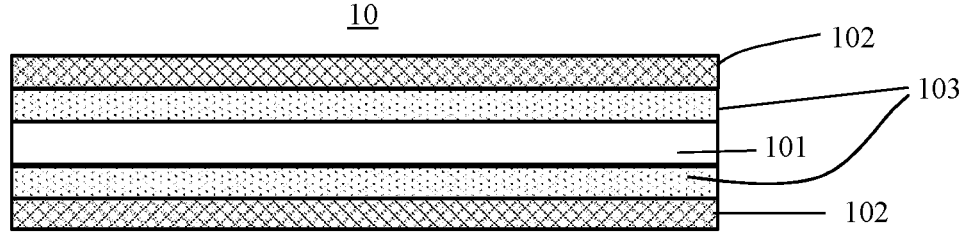
FIG. 2 is a schematic diagram of an embodiment of a negative electrode plate in the secondary battery according to the present application.

FIG. 2 shows a schematic diagram of an embodiment of a negative electrode plate 10 according to the present application. The negative electrode plate 10 is composed of a negative electrode current collector 101, first negative electrode coating layers 103 respectively disposed on two surfaces of the negative electrode current collector 101, and second negative electrode coating layers 102 disposed on the first negative electrode coating layers 103.

Figure 3:
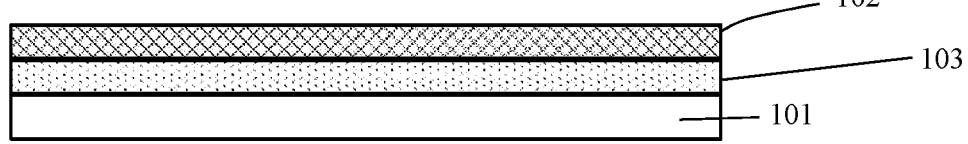
FIG. 3 is a schematic diagram of another embodiment of a negative electrode plate in the secondary battery according to the present application.

FIG. 3 shows a schematic diagram of another embodiment of a negative electrode plate 10 according to the present application. The negative electrode plate 10 is composed of a negative electrode current collector 101, a first negative electrode coating layer 103 disposed on one surface of the negative electrode current collector, and a second negative electrode coating layer 102 disposed on the first negative electrode coating layer 103.

It should be noted that the parameters (such as film thickness, porosity, compaction density, and areal density) of the negative electrode film provided in present application all refer to a parameter range of a single-sided film. When negative electrode films are disposed on two surfaces of the negative electrode current collector and the film parameters on any of the surfaces satisfy the present application, it is considered to fall within the protection scope of the present application. In addition, the ranges of coating thickness, porosity, compaction density, areal density, etc. mentioned in the present application all refer to those coating parameters after cold compaction for assembling a battery.

Moreover, in the secondary battery of the present application, the negative electrode plate does not exclude additional functional layers other than the negative electrode film. For example, in some embodiments, the negative electrode plate described in the present application further includes a conductive undercoat (for example, composed of a conductive agent and a binder) sandwiched between the negative electrode current collector and the first negative electrode coating layer and disposed on the surface of the negative electrode current collector. In some other embodiments, the negative electrode plate described in the present application further includes a protective covering layer covering the surface of the second negative electrode coating layer.

In the present application, the mass percentage of the silicon-based material in the negative electrode active material is a well-known meaning in the art, and can be tested by a method known in the art. For example, a cross section of the negative electrode film (for example, a cross section in the thickness direction of the film) is observed with a scanning electron microscope (for example, ZEISS Sigma 300), and quantitative mapping is performed by energy dispersive X-ray analysis (for example, an energy spectrometer carried in the ZEISS Sigma 300). Thus, an element content of the negative electrode film is measured at the scanning position of the cross section, and an element distribution is obtained. In a region within the cross section, the Si content in the region can be obtained by integrating the Si element distribution. In order to improve the accuracy of test, statistics on a plurality of (such as 10) regions can be collected, and an average value is taken as test result.

In the present application, the particle size of the silicon-based material is a well-known meaning in the art, and can be tested by a method known in the art, for example, by a scanning electron microscope (such as ZEISS Sigma 300). A sample is prepared as follows: first, the negative electrode plate is cut into a sample to be tested with a certain size (such as 2 cm×2 cm), and the negative electrode plate is fixed on a sample stage by means of paraffin. Then the sample stage is loaded into a sample rack, locked and fixed, an argon ion cross-section polisher (such as IB-19500CP) is powered on, vacuumizing is carried out (such as $10^{-4}$ Pa), argon flow (such as 0.15 MPa), voltage (such as 8 KV) and polishing time (such as 2 hours) are set, the sample stage is adjusted to a swing mode, and polishing begins. The sample can be tested with reference to JY/T010-1996. In order to ensure the accuracy of the test result, a plurality of (such as 10) different regions can be randomly selected from the sample to be tested for scanning test, and the particle sizes of all the silicon-base materials within the scale test regions are read under a certain amplification factor (such as 500 times). In order to further improve the accuracy of the test, statistics on the test results of the plurality of regions can be collected.

In the present application, the primary particles and the secondary particles are well-known meanings in the art. The primary particles refer to particles that are not agglomerated. The secondary particles refer to particles that are agglomerated by two or more primary particles. The primary particles and the secondary particles can be easily distinguished by taking a SEM image with a scanning electron microscope.

The quantity percentage of the primary particles or the secondary particles in the negative electrode active material can be measured by instruments and methods known in the art, for example, by a scanning electron microscope. The quantity percentage of the secondary particles can be tested as follows: the negative electrode active material is laid and adhered to a conductive adhesive to obtain a sample to be tested with a length of 6 cm×a width of 1.1 cm; and the morphology of the particles is tested by using a scanning electron microscope (such as ZEISS Sigma 300). The test can refer to JY/T010-1996. In order to ensure the accuracy of the test result, a plurality of (such as 20) different regions can be randomly selected from the sample to be tested for scanning test, and under a certain amplification factor (such as 1000 times), a percentage of a quantity of secondary particles in a total quantity of particles in each region is calculated as the quantity percentage of the secondary particles in this region. An average value of the results by testing the plurality of test regions is taken as test result. The quantity percentage of the primary particles in the first negative electrode active material can also be tested similarly.

In the present application, the $D_v50$ of the negative electrode active material is a well-known meaning in the art, and can be measured by instruments and methods known in the art. For example, the $D_v50$ is measured with reference to GB/T 19077.1-2016 standards by using a laser particle size analyzer (such as Malvern Master Size 3000). The $D_v50$ is a particle size corresponding to 50% of the cumulative volume distribution of the negative electrode active material.

In the present application, the thickness of the negative electrode film is a well-known meaning in the art, and can be measured by a method known in the art, such as a high-accuracy micrometer (such as Mitutoyo 293-100, with a precision of 0.1 μm).

In the present application, the thickness of each of the first negative electrode coating layer and the second negative electrode coating layer can be tested by using a scanning electron microscope (such as ZEISS Sigma 300). A sample is prepared as follows: first, the negative electrode plate is cut into a sample to be tested with a certain size (such as 2 cm×2 cm), and the negative electrode plate is fixed on a sample stage by means of paraffin. Then the sample stage is loaded into a sample rack, locked and fixed, an argon ion cross-section polisher (such as IB-19500CP) is powered on, vacuumizing is carried out (such as $10^{-4}$ Pa), argon flow (such as 0.15 MPa), voltage (such as 8 KV) and polishing time (such as 2 hours) are set, the sample stage is adjusted to a swing mode, and polishing begins. The sample can be tested with reference to JY/T010-1996. In order to ensure the accuracy of the test result, a plurality of (such as 10) different regions can be randomly selected from the sample to be tested for scanning test, the thickness of each of the first negative electrode coating layer and the second negative electrode coating layer in each scale test region is read under a certain amplification factor (such as 500 times), and an average value of the plurality of test regions is taken as the test result.

In the present application, the areal density of the negative electrode film is a well-known meaning in the art, and can be tested by a method known in the art. For example, a single-sided coated and cold-pressed negative electrode plate (if it is a double-sided coated negative electrode plate, a negative electrode film on one side can be first wiped off) is punched into a small round piece with an area of S1, and the small piece is weighed with the weight denoted as M1. Then the negative electrode film of the weighed negative electrode plate is wiped off, the negative electrode current collector is weighed with the weight denoted as M0, and the areal density of the negative electrode film=(the weight M1 of the negative electrode plate–the weight M0 of the negative electrode current collector)/S1.

In the present application, the compaction density of the negative electrode film is a well-known meaning in the art, and can be tested by a method known in the art. The compaction density of the negative electrode film=the areal density of the negative electrode film/the thickness of the negative electrode film.

It should be noted that the various parameters of the negative electrode active material as described above can be tested by sampling before coating, and can also be tested by sampling from the cold-pressed negative electrode coating layer.

When the above test sample is taken from the cold-pressed negative electrode film, as an example, the sample can be taken as follows:

(1) First, a cold-pressed negative electrode film is selected arbitrarily, and a second negative electrode active material is sampled (by scraping powders with a blade), wherein the scraping depth does not exceed a boundary between a first negative electrode coating layer and a second negative electrode coating layer.

(2) Second, a first negative electrode active material is sampled. During cold pressing of the negative electrode film, there may be a mutual melting layer in the boundary between the first negative electrode coating layer and the second negative electrode coating layer (that is, the first negative electrode active material and the second negative electrode active material exist in the mutual melting layer at the same time). Thus, for the accuracy of test, when the first negative electrode active material is sampled, the mutual melting layer can be first scraped off, and then the first negative electrode active material is sampled by scraping powder.

(3) The first negative electrode active material and the second negative electrode active material collected above are respectively placed in deionized water, and the first negative electrode active material and the second negative electrode active material are filtered, dried, and then sintered at a certain temperature and time (for example, 400° C., 2 h) to remove a binder and conductive carbon, thus obtaining test samples of the first negative electrode active material and the second negative electrode active material, respectively.

In the above sampling process, an optical microscope or a scanning electron microscope may be used to assist in determining the boundary between the first negative electrode coating layer and the second negative electrode coating layer.

[Positive Electrode Plate]

In the secondary battery of the present application, the positive electrode plate includes a positive electrode current collector and a positive electrode film disposed on at least one surface of the positive electrode current collector, and the positive electrode film includes a positive electrode active material. For example, the positive electrode current collector has two opposite surfaces in its own thickness diirection, and the positive electrode film is disposed on either or both of the two opposite surfaces of the positive electrode current collector.

In the secondary battery of the present application, the positive electrode active material may be a positive electrode active material for secondary batteries known in the art. For example, the positive electrode active material may include one or more of a lithium transition metal oxide, a lithium-containing phosphate with an olivine structure, and respective modified compounds thereof. Examples of the lithium transition metal oxide can include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the lithium-containing phosphate with an olivine structure can include, but are not limited to, one or more of lithium iron phosphate, lithium manganese phosphate, lithium iron manganese phosphate, a composite material of lithium iron phosphate and carbon, a composite material of lithium manganese phosphate and carbon, a composite material of lithium iron manganese phosphate and carbon, and modified compounds thereof. The present application is not limited to these materials, and other conventionally known materials that can be used as positive electrode active materials for secondary batteries may also be used.

In some preferred embodiments, in order to further increase the energy density of the battery, the positive electrode active material can include one or more of the lithium transition metal oxide shown in a formula 1 below and modified compounds thereof,

$$Li_aNi_bCo_cM_dO_eA_f \qquad \text{formula 1,}$$

in which, $0.8 \leq a \leq 1.2$, $0.5 \leq b < 1$, $0 < c < 1$, $0 < d < 1$, $1 \leq e \leq 2$, $0 \leq f \leq 1$, M is one or more selected from Mn, Al, Zr, Zn, Cu, Cr, Mg, Fe, V, Ti and B, and A is one or more selected from N, F, S and Cl.

In the present application, the modified compounds of the above-mentioned materials can be obtained by doping modification and/or surface coating modification of the positive electrode active materials.

In the secondary battery of the present application, the positive electrode film usually includes a positive electrode active material, an optional binder and an optional conductive agent, and is usually formed by coating with a positive electrode slurry, drying and cold pressing. The positive electrode slurry is usually formed by dispersing the positive electrode active material and optional conductive agent and binder in a solvent and stirring uniformly. The solvent can be N-methylpyrrolidone (NMP).

As an example, the binder for the positive electrode film can include one or more of polyvinylidene fluoride (PVDF) and polytetrafluoroethylene (PTFE).

As an example, the conductive agent for the positive electrode film can include one or more of graphite, superconducting carbon, acetylene black, carbon black, Ketjen black, carbon dots, carbon nanotubes, graphene, and carbon nanofibers.

In the secondary battery of the present application, the positive electrode current collector may be a metal foil or a composite current collector (a metal material can be disposed on a polymer substrate to form the composite current collector). As an example, an aluminum foil may be used as the positive electrode current collector.

[Electrolyte]

The secondary battery of the present application has no specific restrictions on the type of electrolyte, which may be selected according to requirements. For example, the electrolyte can be selected from at least one of a solid electrolyte and a liquid electrolyte (i.e., electrolyte liquid).

In some embodiments, electrolyte liquid is used as the electrolyte. The electrolyte liquid includes an electrolyte salt and a solvent.

In some embodiments, the electrolyte salt can be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithiumtetrafluorooxalate phosphate).

In some embodiments, the solvent can be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, the electrolyte can further optionally include additives. For example, the additives can include negative electrode film-forming additives, positive electrode film-forming additives, and additives that can improve some performances of the battery, such as additives that improve overcharge performance of the battery, additives that improve high-temperature performance of the battery, and additives that improve low-temperature performance of the battery.

[Separator]

Secondary batteries using electrolytes and some secondary batteries using solid electrolytes further include separators. The separator is disposed between the positive electrode plate and the negative electrode plate for separation. The type of the separator is not specially limited in the present application, and the separator can be any known porous separator with good chemical and mechanical stability. In some embodiments, the material of the separator can be one or more selected from glass fibers, a non-woven fabric, polyethylene, polypropylene, and polyvinylidene fluoride. The separator can be a single-layer film or a multi-layer composite film. When the separator is a multi-layer composite film, the materials of respective layers are the same or different.

In some embodiments, the positive electrode plate, the negative electrode plate, and the separator can be made into an electrode assembly by a winding process or a stacking process.

In some embodiments, the secondary battery can include an outer package. The outer package can be used to package the electrode assembly and an electrolyte.

In some embodiments, the outer package of the secondary battery can be a hard case, such as a hard plastic case, an aluminum case, a steel case, etc. The outer package of the secondary battery can also be a soft bag, such as a pocket type soft bag. The material of the soft bag can be plastic, such as one or more of polypropylene (PP), polybutylene terephthalate (PBT), polybutylene succinate (PBS), etc.

The present application has no specific restrictions on the shape of the secondary battery. The secondary battery can be cylindrical, square, or in other arbitrary shape. FIG. 1 shows a secondary battery 5 with a square structure as an example.

Figure 4:
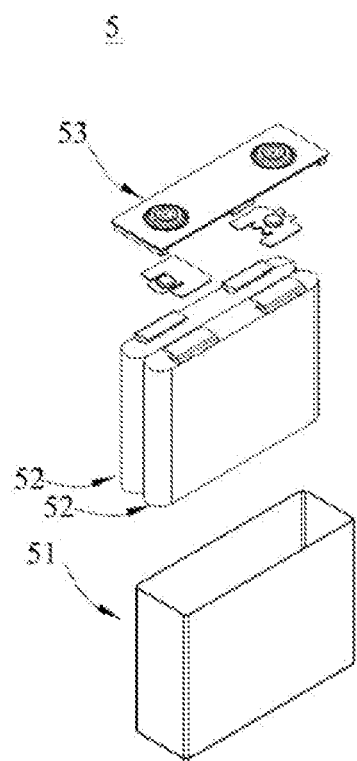
FIG. 4 is an exploded schematic diagram of an embodiment of the secondary battery according to the present application.

In some embodiments, referring to FIG. 4, the outer package can include a shell 51 and a cover plate 53. The shell 51 can include a bottom plate and side plates connected to the bottom plate, and the bottom plate and the side plates enclose a receiving cavity. The shell 51 has an opening communicated with the receiving cavity, and the cover plate 53 is used for covering the opening to close the receiving cavity. The positive electrode plate, the negative electrode plate and the separator can be wound or laminated to form an electrode assembly 52. The electrode assembly 52 is packaged in the receiving cavity. The electrolyte infiltrates the electrode assembly 52. The secondary battery 5 includes one or more electrode assemblies 52, which can be adjusted according to requirements.

In some embodiments, the secondary batteries can be assembled into a battery module, the battery module can include a plurality of secondary batteries, and the specific number can be adjusted according to the application and capacity of the battery module.

Figure 5:
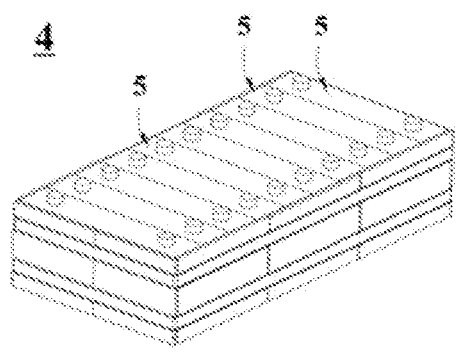
FIG. 5 is a schematic diagram of an embodiment of a battery module according to the present application.

FIG. 5 shows a battery module 4 as an example. Referring to FIG. 5, in the battery module 4, a plurality of secondary batteries 5 can be disposed sequentially in a length direction of the battery module 4. Apparently, they can also be disposed in any other way. Further, the plurality of secondary batteries 5 can be fixed by fasteners.

Optionally, the battery module 4 can further include a housing having a receiving space, and the plurality of secondary batteries 5 are received in the receiving space.

In some embodiments, the above-mentioned battery modules can also be assembled into a battery pack, and the number of battery modules included in the battery pack can be adjusted according to the application and capacity of the battery pack.

Figure 6:
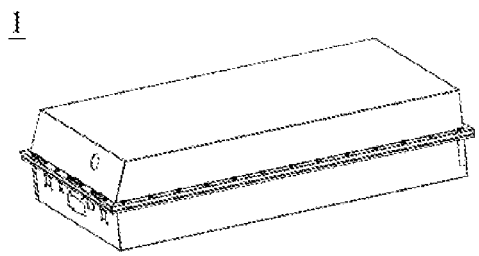
FIG. 6 is a schematic diagram of an embodiment of a battery pack according to the present application.
Figure 7:
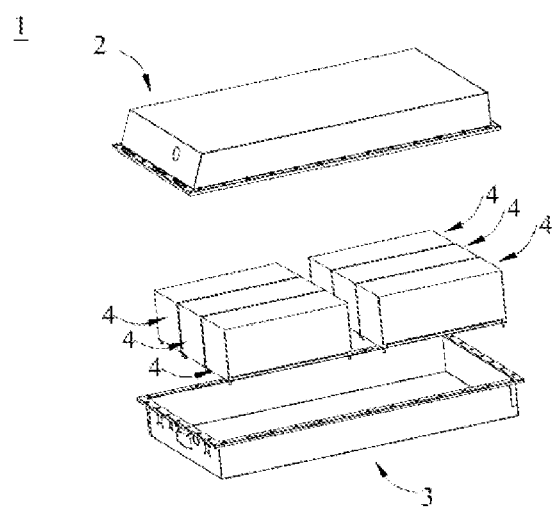
FIG. 7 is an exploded view of FIG. 6.

FIGS. 6 and 7 show a battery pack 1 as an example. Referring to FIGS. 6 and 7, the battery pack 1 can include a battery box and a plurality of battery modules 4 disposed in the battery box. The battery box includes an upper box body 2 and a lower box body 3. The upper box body 2 covers the lower box body 3 to form a closed space for receiving the battery modules 4. The plurality of battery modules 4 can be disposed in the battery box in any way.

Preparation Process

An embodiment in the second aspect of the present application provides a process for preparing a secondary battery, including preparing a negative electrode plate of the secondary battery by the following steps of:

S10, forming a first negative electrode coating layer including a first negative electrode active material on at least one surface of a negative electrode current collector, wherein the first negative electrode active material includes graphite, and the first negative electrode active material includes or does not include a silicon-based material;

S20, forming a second negative electrode coating layer including a second negative electrode active material on a surface of the first negative electrode coating layer opposite to the negative electrode current collector, wherein the second negative electrode active material includes artificial graphite and a silicon-based material, wherein the silicon-based material is present at a mass percentage denoted as W1 in the first negative electrode active material, the silicon-based material is present at a mass percentage denoted as W2 in the second negative electrode active material, and the negative electrode plate satisfies: W2≥W1.

In the process for processing the secondary battery according to the present application, a first negative electrode active material slurry and a second negative electrode active material slurry can be coated at the same time or in two separate steps.

Preferably, the first negative electrode active material slurry and the second negative electrode active material slurry are coated at the same time. By coating at the same time, better adhesion between the first negative electrode coating layer and the second negative electrode coating layer may be obtained, which is conducive to further improving the cycle performance of the battery.

Except the process for preparing the negative electrode plate of the present application, other structures and preparation processes of the secondary battery according to the present application are well known. For example, the positive electrode plate of the present application can be prepared as follows: a positive electrode active material, an optional conductive agent, an optional binder and the like are mixed and then dispersed in a solvent (such as NMP), followed by uniform stirring, coating on a positive electrode current collector, drying, and cold pressing, thus obtaining the positive electrode plate.

In some embodiments, the negative electrode plate, the positive electrode plate, the separator, and the electrolyte can be assembled to form a secondary battery. As an example, the positive electrode plate, the separator, and the negative electrode plate can be wound or laminated to form an electrode assembly; and the electrode assembly is placed in an outer package, then electrolyte is injected, followed by procedures including vacuum packaging, standing, formation, shaping and the like, thus obtaining a secondary battery.

The preferred technical features of the secondary battery of the present application are also applicable to the preparation process of the present application.

Apparatus

An embodiment in the third aspect of the present application provides an apparatus. The apparatus includes the secondary battery according to the first aspect of the present application and/or the secondary battery prepared by the process according to the second aspect of the present application. The secondary battery may be used as a power source of the apparatus, and may also be used as an energy storage unit of the apparatus. The apparatus can be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus can be equipped with the secondary battery, the battery module, or the battery pack according to its usage requirements.

Figure 8:
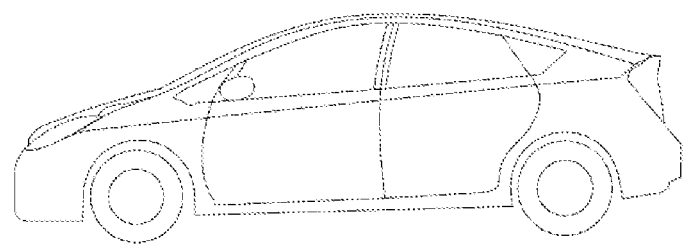
FIG. 8 is a schematic diagram of an embodiment of an apparatus using the secondary battery of the present application as a power source.

FIG. 8 shows an apparatus as an example. The apparatus is a pure electric vehicle, a hybrid electric vehicle, or a plug-in hybrid electric vehicle. In order to meet the requirements of the apparatus for high power and high energy density, a battery pack or a battery module can be used.

As another example, the apparatus can be a mobile phone, a tablet computer, a notebook computer, etc. The apparatus is generally required to be thin and light, and the secondary battery can be used as a power source.

Some exemplary embodiments of the present invention are provided as follows.

Embodiment 1. A secondary battery, comprising a negative electrode plate, wherein the negative electrode plate comprises a negative electrode current collector and a negative electrode film;

the negative electrode film comprises a first negative electrode coating layer and a second negative electrode coating layer;

the first negative electrode coating layer is disposed on at least one surface of the negative electrode current collector and comprises a first negative electrode active material, the first negative electrode active material comprises graphite, and the first negative electrode active material comprises or does not comprise a silicon-based material;

the second negative electrode coating layer is disposed on a surface of the first negative electrode coating layer and comprises a second negative electrode active material, and the second negative electrode active material comprises artificial graphite and a silicon-based material;

the silicon-based material is present at a mass percentage denoted as W1 in the first negative electrode active material, the silicon-based material is present at a mass percentage denoted as W2 in the second negative electrode active material, and the negative electrode plate satisfies: W2≥W1.

Embodiment 2. The secondary battery according to Embodiment 1, wherein 0%<W2≤6%, and preferably, 1%≤W2≤3%.

Embodiment 3. The secondary battery according to any one of Embodiments 1 and 2, wherein 0%≤W1≤5%, preferably, 0%≤W1≤3%, and more preferably, W1=0%.

Embodiment 4. The secondary battery according to any one of Embodiments 1 to 3, wherein W1+W2≤6%, and preferably, W1+W2≤3%.

Embodiment 5. The secondary battery according to any one of Embodiments 1 to 4, wherein the silicon-based material comprises a first silicon-based material and a second silicon-based material, and the first silicon-based material has a particle size smaller than that of the second silicon-based material.

Embodiment 6. The secondary battery according to any one of Embodiments 1 to 5, wherein,
the first silicon-based material has a particle size of from 0.05 μm to 7 μm; and/or,
the second silicon-based material has a particle size of from 7 μm to 15 μm.

Embodiment 7. The secondary battery according to any one of Embodiments 1 to 6, wherein the first negative electrode active material comprises one or more of artificial graphite and natural graphite; and preferably, the first negative electrode active material comprises artificial graphite.

Embodiment 8. The secondary battery according to Embodiment 7, wherein the artificial graphite is present at a mass percentage of ≥50% in the first negative electrode active material; and preferably, the artificial graphite is present at a mass percentage of from 60% to 100% in the first negative electrode active material.

Embodiment 9. The secondary battery according to any one of Embodiments 1 to 8, wherein the first negative electrode active material comprises primary particles, and the primary particles have a quantity percentage of ≥60%, preferably from 80% to 100% in the first negative electrode active material.

Embodiment 10. The secondary battery according to any one of Embodiments 1 to 9, wherein the second negative electrode active material comprises secondary particles, and the secondary particles have a quantity percentage of ≥50%, preferably ≥70% in the second negative electrode active material.

Embodiment 11. The secondary battery according to any one of Embodiments 1 to 10, wherein the first negative electrode active material has a volume average particle size $D_v50$ greater than that of the second negative electrode active material.

Embodiment 12. The secondary battery according to any one of Embodiments 1 to 11, wherein the first negative electrode active material has a volume average particle size $D_v50$ of from 12 μm to 18 μm, and preferably from 13 μm to 17 μm; and/or,
the second negative electrode active material has a volume average particle size $D_v50$ of from 9 μm to 15 μm, and preferably from 10 μm to 13 μm.

Embodiment 13. The secondary battery according to any one of Embodiments 1 to 12, wherein the silicon-based material comprises one or more of an elemental silicon, a silicon-oxygen compound, a silicon-carbon composite, a silicon-nitrogen compound, and a silicon alloy; and preferably, the silicon-based material comprises the silicon-oxygen compound.

Embodiment 14. The secondary battery according to any one of Embodiments 1 to 13, wherein the negative electrode film further satisfies one or more of the following (1) to (5):

(1) the negative electrode film has an areal density of from 8 mg/cm² to 13 mg/cm², and preferably from 9 mg/cm² to 12.5 mg/cm²;
(2) the negative electrode film has a compaction density of from 1.4 g/cm³ to 1.7 g/cm³, and preferably from 1.5 g/cm³ to 1.65 g/cm³;
(3) the second negative electrode coating layer has a porosity greater than that of the first negative electrode coating layer;
(4) an areal density ratio of the first negative electrode coating layer to the second negative electrode coating layer is from 2:3 to 3:2;
(5) a thickness ratio of the first negative electrode coating layer to the second negative electrode coating layer is from 4:6 to 7:3.

Embodiment 15. The secondary battery according to any one of Embodiments 1 to 14, wherein the secondary battery comprises a positive electrode plate, the positive electrode plate comprises a positive electrode current collector and a positive electrode coating layer disposed on at least one surface of the positive electrode current collector, and the positive electrode coating layer comprises a positive electrode active material, and the positive electrode active material comprises one or more of a lithium transition metal oxide, a lithium-containing phosphate with an olivine structure, and modified compounds thereof;
preferably, the positive electrode active material comprises one or more of the lithium transition metal oxide shown in formula 1 and modified compounds thereof,

     formula 1, in the formula 1, 0.8≤a≤1.2, 0.5≤b<1, 0<c<1, 0<d<1, 1≤e≤2, 0≤f≤1, M is one or more selected from Mn, Al, Zr, Zn, Cu, Cr, Mg, Fe, V, Ti and B, and A is one or more selected from N, F, S and Cl.

Embodiment 16. A process for preparing a secondary battery, comprising preparing a negative electrode plate of the secondary battery by the following steps:
forming a first negative electrode coating layer comprising a first negative electrode active material on at least one surface of a negative electrode current collector, wherein the first negative electrode active material comprises graphite, and the first negative electrode active material comprises or does not comprise a silicon-based material;
forming a second negative electrode coating layer comprising a second negative electrode active material on a surface of the first negative electrode coating layer, wherein the second negative electrode active material comprises artificial graphite and a silicon-based material;
wherein the silicon-based material is present at a mass percentage denoted as W1 in the first negative electrode active material, the silicon-based material is present at a mass percentage denoted as W2 in the second negative electrode active material, and the negative electrode plate satisfies: W2≥W1.

Embodiment 17. An apparatus, comprising the secondary battery according to any one of Embodiments 1 to 15 or the secondary battery prepared by the process according to Embodiment 16.

EXAMPLES

The following examples more specifically describe the content disclosed in the present application, and these examples are only used for explanatory description, because various modifications and changes within the scope of the present disclosure are apparent to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Preparation of a Negative Electrode Plate

Artificial graphite as a first negative electrode active material, carbon black (Super P) as a conductive agent, styrene-butadiene rubber (SBR) as a binder and sodium carboxymethyl cellulose (CMC-Na) as a thickener were mixed thoroughly at a mass ratio of 96:1.5:1.5:1 in an appropriate amount of deionized water as a solvent to form a uniform first negative electrode slurry; wherein the first negative electrode active material had a volume average particle size $D_v50$ of 15.7 μm, and primary particles had a quantity percentage of 95% in the first negative electrode active material.

As a second negative electrode active material, artificial graphite and a silicon-based material $SiO_x$ (x≈1.05) were mixed at a mass ratio of 97:3 to obtain a mixture, and then the mixture was mixed with a conductive agent (Super P), styrene-butadiene rubber (SBR) as a binder and sodium carboxymethyl cellulose (CMC-Na) as a thickener thoroughly at a mass ratio of 96:1.5:1.5:1 in an appropriate amount of deionized water as a solvent to form a uniform second negative electrode slurry; wherein the second negative electrode active material had a volume average particle size $D_v50$ of 11.5 μm, and secondary particles had a quantity percentage of 90% in the second negative electrode active material.

The first negative electrode slurry and the second negative electrode slurry were simultaneously extruded by a double-cavity coating device. The first negative electrode slurry was applied on a current collector to form a first negative electrode coating layer, the second negative electrode slurry was applied on the first negative electrode coating layer to form a second negative electrode coating layer, and a negative electrode plate was obtained after drying and cold pressing. The negative electrode film had an areal density of 11 mg/cm² and a compaction density of 1.65 g/cm³, and a ratio of areal densities of the first negative electrode coating layer to the second negative electrode coating layer was 5:5.

Preparation of a Positive Electrode Plate $LiNi_{0.8}Co_{0.1}Mn_{0.1}O_2$ (NCM811) as a positive electrode active material, Super P as a conductive agent, and polyvinylidene fluoride (PVDF) as a binder were mixed thoroughly at a weight ratio of 97:1.5:1.5 in an appropriate amount of N-methylpyrrolidone (NMP) as a solvent to form a uniform positive electrode slurry, the positive electrode slurry was coated on a surface of an aluminum foil as a positive electrode current collector, and a positive electrode plate was obtained after drying and cold pressing. The positive electrode film had an areal density of 17.5 mg/cm² and a compaction density of 3.4 g/cm³.

Preparation of an Electrolyte

Ethylene carbonate (EC), ethyl methyl carbonate (EMC), and diethyl carbonate (DEC) were mixed at a volume ratio of 4:3:3 to obtain a solution, and then $LiPF_6$ was uniformly dissolved in the solution to obtain an electrolyte, wherein $LiPF_6$ had a concentration of 1 mol/L.

Separator

A PE separator was used.

Preparation of a Secondary Battery

The positive electrode plate, the separator, and the negative electrode plate were laminated in order and wound to obtain an electrode assembly. The electrode assembly was packaged in an outer package. The above-mentioned electrolyte was added. A secondary battery was obtained after steps of packaging, standing, formation, aging, etc.

Examples 2-27 and Comparative Examples 1-6

Their preparation processes were similar to that of Example 1, except that: relevant parameters in the process for preparing the negative electrode plate were adjusted to obtain corresponding secondary batteries, as shown in Table 1 for details.

Test Section

1) Test on Fast Charging Capability of Batteries

At 25° C., the battery in each of the above embodiments and comparative examples was charged and discharged for the first time at a current of 1 C (i.e., a theoretical capacity value of current completely discharged within 1 h). Specifically, the battery was charged at a constant current of 1 C to a voltage of 4.25 V, then charged at a constant voltage until the current was ≤0.05 C, stood for 5 min, and then discharged at a constant current of 0.33 C to a voltage of 2.8 V, and its actual capacity was recorded as C0.

Then the battery was charged at constant currents of 1.0 C0, 1.3 C0, 1.5 C0, 1.8 C0, 2.0 C0, 2.3 C0, 2.5 C0, and 3.0 C0 sequentially to a full battery charge cut-off voltage 4.25 V or 0 V negative electrode cut-off potential (whichever was reached first). The battery was discharged to a full battery discharge cut-off voltage of 2.8 V with 1 C0 after each charge. Negative electrode potentials corresponding to the state of being charged to 10%, 20%, 30%, . . . , 80% SOC (State of Charge) under different discharge rates were recorded. Charge rate-negative electrode potential curves in different SOCs were drawn and linearly fitted, to obtain charge rates corresponding to the charge rates when the negative electrode potentials were 0 V in different SOCs. The obtained charge rates were charge windows in the SOCs and respectively denoted as C10% SOC, C20% SOC, C30% SOC, C40% SOC, C50% SOC, C60% SOC, C70% SOC, and C80% SOC. Charge time T (under the premise of no lithium precipitation in the battery) in mm for charging the battery from 10% SOC to 80% SOC was calculated according to a formula (60/C20% SOC+60/C30% SOC+60/C40% SOC+60/C50% SOC+60/C60% SOC+60/C70% SOC+60/C80% SOC)×10%. The shorter the time was, the better the fast charging performance of the battery was.

2) Test on Cycle Performance of Batteries

At 25° C., the secondary battery prepared in each of the examples and comparative examples was charged at a constant current of 1 C to a charge cut-off voltage of 4.25 V, then charged at a constant voltage until the current was <0.05 C, stood for 5 min, and then discharged at a constant current of 1 C to a discharge cut-off voltage of 2.8 V, and stood for 5 mm. This was a charge-discharge cycle. According to this method, the battery was circularly charged and discharged until the capacity of the battery decayed to 80%. The number of cycles at this time was the cycle life of the battery at 25° C.

TABLE 1

| No. | First negative electrode coating layer (lower layer) | | | | | | Second negative electrode coating layer (upper layer) | |
|---|---|---|---|---|---|---|---|---|
| | Species of first negative electrode active material (mass percentage) | W1 | Mass percentage of conductive agent | Mass percentage of binder | Mass percentage of thickener | $D_v50$ of first negative electrode active material µm | Species of second negative electrode active material | W2 |
| Example 1 | Artificial graphite | 0% | 1.5% | 1.5% | 1.0% | 15.7 | Artificial graphite + silicon monoxide | 0.5% |
| Example 2 | Artificial graphite | 0% | 1.5% | 1.5% | 1.0% | 15.7 | Artificial graphite + silicon monoxide | 1.0% |
| Example 3 | Artificial graphite | 0% | 1.5% | 1.5% | 1.0% | 15.7 | Artificial graphite + silicon monoxide | 1.5% |
| Example 4 | Artificial graphite | 0% | 1.5% | 1.5% | 1.0% | 15.7 | Artificial graphite + silicon monoxide | 2.0% |
| Example 5 | Artificial graphite | 0% | 1.5% | 1.5% | 1.0% | 15.7 | Artificial graphite + silicon monoxide | 2.5% |
| Example 6 | Artificial graphite | 0% | 1.5% | 1.5% | 1.0% | 15.7 | Artificial graphite + silicon monoxide | 3.0% |
| Example 7 | Artificial graphite | 0% | 1.5% | 1.5% | 1.0% | 15.7 | Artificial graphite + silicon monoxide | 5.0% |
| Example 8 | Artificial graphite | 0% | 1.5% | 1.5% | 1.0% | 15.7 | Artificial graphite + silicon monoxide | 6.0% |
| Example 9 | Artificial graphite + silicon monoxide | 1.0% | 1.5% | 1.5% | 1.0% | 15.7 | Artificial graphite + silicon monoxide | 3.0% |
| Example 10 | Artificial graphite + silicon monoxide | 2.0% | 1.5% | 1.5% | 1.0% | 15.7 | Artificial graphite + silicon monoxide | 3.0% |
| Example 11 | Artificial graphite + silicon monoxide | 3.0% | 1.2% | 1.8% | 1.0% | 15.7 | Artificial graphite + silicon monoxide | 3.0% |
| Example 12 | Artificial graphite + silicon monoxide | 2.0% | 1.2% | 1.8% | 1.0% | 15.7 | Artificial graphite + silicon monoxide | 5.0% |
| Example 13 | Artificial graphite + silicon monoxide | 3.0% | 1.2% | 1.8% | 1.0% | 15.7 | Artificial graphite + silicon monoxide | 5.0% |
| Example 14 | Artificial graphite + silicon monoxide | 5.0% | 1.2% | 1.8% | 1.0% | 15.7 | Artificial graphite + silicon monoxide | 5.0% |
| Example 15 | Natural graphite | 0% | 1.5% | 1.5% | 1.0% | 15.7 | Artificial graphite + silicon monoxide | 2.0% |
| Example 16 | Artificial graphite: natural graphite = 60:40 | 0% | 1.5% | 1.5% | 1.0% | 15.7 | Artificial graphite + silicon monoxide | 2.0% |
| Example 17 | Artificial graphite: natural graphite = | 0% | 1.5% | 1.5% | 1.0% | 15.7 | Artificial graphite + silicon monoxide | 2.0% |

TABLE 1-continued

80:20

| | | Second negative electrode coating layer (upper layer) | | | | | |
|---|---|---|---|---|---|---|---|
| No. | | Mass percentage of conductive agent | Mass percentage of binder | Mass percentage of thickener | $D_v50$ of second negative electrode active material μm | W1 + W2 | Fast charging time min | Cycle life cycles |
| | Example 1 | 1.5% | 1.5% | 1.0% | 11.5 | 0.5% | 21.1 | 1850 |
| | Example 2 | 1.5% | 1.5% | 1.0% | 11.5 | 1.0% | 20.5 | 1820 |
| | Example 3 | 1.5% | 1.5% | 1.0% | 11.5 | 1.5% | 19.8 | 1780 |
| | Example 4 | 1.5% | 1.5% | 1.0% | 11.5 | 2.0% | 19.1 | 1735 |
| | Example 5 | 1.2% | 1.8% | 1.0% | 11.5 | 2.5% | 18.8 | 1708 |
| | Example 6 | 1.2% | 1.8% | 1.0% | 11.5 | 3.0% | 18.5 | 1684 |
| | Example 7 | 1.2% | 1.8% | 1.0% | 11.5 | 5.0% | 18.3 | 1659 |
| | Example 8 | 1.2% | 1.8% | 1.0% | 11.5 | 6.0% | 18.7 | 1533 |
| | Example 9 | 1.5% | 1.5% | 1.0% | 11.5 | 4.0% | 19.3 | 1635 |
| | Example 10 | 1.2% | 1.8% | 1.0% | 11.5 | 5.0% | 19.1 | 1608 |
| | Example 11 | 1.2% | 1.8% | 1.0% | 11.5 | 6.0% | 18.8 | 1575 |
| | Example 12 | 1.2% | 1.8% | 1.0% | 11.5 | 7.0% | 18.6 | 1555 |
| | Example 13 | 1.2% | 1.8% | 1.0% | 11.5 | 8.0% | 18.4 | 1547 |
| | Example 14 | 1.2% | 1.8% | 1.0% | 11.5 | 10.0% | 18.5 | 1533 |
| | Example 15 | 1.5% | 1.5% | 1.0% | 11.5 | 2.0% | 19.5 | 1589 |
| | Example 16 | 1.5% | 1.5% | 1.0% | 11.5 | 2.0% | 19.2 | 1622 |
| | Example 17 | 1.5% | 1.5% | 1.0% | 11.5 | 2.0% | 18.9 | 1700 |

| | First negative electrode coating layer (lower level) | | | | | | Second negative electrode coating layer (upper layer) | |
|---|---|---|---|---|---|---|---|---|
| No. | Species of first negative electrode active material | W1 | Mass percentage of conductive agent | Mass percentage of binder | Mass percentage of thickener | $D_v50$ of first negative electrode active material μm | Species of second negative electrode active material | W2 |
| Example 18 | Artificial graphite | 0% | 1.5% | 1.5% | 1.0% | 12.5 | Artificial graphite + silicon monoxide | 2.0% |
| Example 19 | Artificial graphite | 0% | 1.5% | 1.5% | 1.0% | 13.7 | Artificial graphite + silicon monoxide | 2.0% |
| Example 20 | Artificial graphite | 0% | 1.5% | 1.5% | 1.0% | 14.5 | Artificial graphite + silicon monoxide | 2.0% |
| Example 21 | Artificial graphite | 0% | 1.5% | 1.5% | 1.0% | 16.9 | Artificial graphite + silicon monoxide | 2.0% |
| Example 22 | Artificial graphite | 0% | 1.5% | 1.5% | 1.0% | 17.8 | Artificial graphite + silicon monoxide | 2.0% |
| Example 23 | Artificial graphite | 0% | 1.5% | 1.5% | 1.0% | 15.7 | Artificial graphite + silicon monoxide | 2.0% |
| Example 24 | Artificial graphite | 0% | 1.5% | 1.5% | 1.0% | 15.7 | Artificial graphite + silicon monoxide | 2.0% |
| Example 25 | Artificial graphite | 0% | 1.5% | 1.5% | 1.0% | 15.7 | Artificial graphite + silicon monoxide | 2.0% |
| Example 26 | Artificial graphite | 0% | 1.5% | 1.5% | 1.0% | 15.7 | Artificial graphite + silicon monoxide | 2.0% |
| Example 27 | Artificial graphite | 0% | 1.5% | 1.5% | 1.0% | 15.7 | Artificial graphite + silicon monoxide | 2.0% |
| Comparative Example 1 | Artificial graphite + silicon monoxide | 5.0% | 1.2% | 1.8% | 1.0% | 15.7 | Artificial graphite + silicon monoxide | 3.0% |
| Comparative Example 2 | Artificial graphite + silicon monoxide | 3.0% | 1.2% | 1.8% | 1.0% | 15.7 | Artificial graphite | 0% |

TABLE 1-continued

| | | | | | | | | |
|---|---|---|---|---|---|---|---|---|
| Comparative Example 3 | Natural graphite + silicon monoxide | 5.0% | 1.2% | 1.8% | 1.0% | 15.7 | Artificial graphite + silicon monoxide | 3.0% |
| Comparative Example 4 | Natural graphite + silicon monoxide | 3.0% | 1.2% | 1.8% | 1.0% | 15.7 | Artificial graphite | 0% |
| Comparative Example 5 | Artificial graphite: natural graphite: silicon monoxide = 60:35:5 | 5.0% | 1.2% | 1.8% | 1.0% | 15.7 | Artificial graphite + silicon monoxide | 3.0% |
| Comparative Example 6 | Artificial graphite: natural graphite: silicon monoxide = 60:35:5 | 5.0% | 1.2% | 1.8% | 1.0% | 15.7 | Artificial graphite | 0% |

| | Second negative electrode coating layer (upper layer) | | | | | | |
|---|---|---|---|---|---|---|---|
| No. | Mass percentage of conductive agent | Mass percentage of binder | Mass percentage of thickener | $D_v50$ of second negative electrode active material μm | W1 + W2 | First charging time min | Cycle performance cycles |
| Example 18 | 1.5% | 1.5% | 1.0% | 11.5 | 2.0% | 18.3 | 1656 |
| Example 19 | 1.5% | 1.5% | 1.0% | 11.5 | 2.0% | 18.5 | 1699 |
| Example 20 | 1.5% | 1.5% | 1.0% | 11.5 | 2.0% | 18.7 | 1728 |
| Example 21 | 1.5% | 1.5% | 1.0% | 11.5 | 2.0% | 19.4 | 1755 |
| Example 22 | 1.5% | 1.5% | 1.0% | 11.5 | 2.0% | 20.0 | 1804 |
| Example 23 | 1.5% | 1.5% | 1.0% | 9.5 | 2.0% | 17.5 | 1612 |
| Example 24 | 1.5% | 1.5% | 1.0% | 10.6 | 2.0% | 18.6 | 1700 |
| Example 25 | 1.5% | 1.5% | 1.0% | 12.8 | 2.0% | 19.5 | 1805 |
| Example 26 | 1.5% | 1.5% | 1.0% | 13.7 | 2.0% | 21.4 | 1877 |
| Example 27 | 1.5% | 1.5% | 1.0% | 14.5 | 2.0% | 21.6 | 1900 |
| Comparative Example 1 | 1.2% | 1.8% | 1.0% | 11.5 | 8.0% | 22.6 | 1401 |
| Comparative Example 2 | 1.5% | 1.5% | 1.0% | 11.5 | 3.0% | 23.0 | 1389 |
| Comparative Example 3 | 1.2% | 1.8% | 1.0% | 11.5 | 8.0% | 22.3 | 1377 |
| Comparative Example 4 | 1.5% | 1.5% | 1.0% | 11.5 | 3.0% | 22.8 | 1323 |
| Comparative Example 5 | 1.2% | 1.8% | 1.0% | 11.5 | 8.0% | 22.5 | 1381 |
| Comparative Example 6 | 1.5% | 1.5% | 1.0% | 11.5 | 5.0% | 22.7 | 1345 |

It can be seen from the results in the table that, in the secondary battery according the embodiments of the present application, the negative electrode plate included a double-coating structure, and both the upper and lower negative electrode coating layers include a specific negative electrode active material, so that the secondary battery had relatively good fast charging capability and cycle performance under the premise of relatively high energy density.

Comparative Examples 1-6 did not satisfy W2≥W1, resulting in poor fast charging capability and cycle life of the secondary battery.

In addition, from Examples 6, 9-11, 8 and 12-14, it can be seen that when the first negative electrode coating layer also included a silicon-based material and satisfied W2≥W1, although the energy density of the battery was increased to a certain extent, the fast charging performance and cycle performance of the battery were slightly affected.

Described above are merely specific embodiments of the present application, but the protection scope of the present application is not limited to this. Any skilled person who is familiar with this art would readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A secondary battery, comprising a negative electrode plate, wherein the negative electrode plate comprises a negative electrode current collector and a negative electrode film;

the negative electrode film comprises a first negative electrode coating layer and a second negative electrode coating layer;

the first negative electrode coating layer is disposed on at least one surface of the negative electrode current collector and comprises a first negative electrode active material, the first negative electrode active material comprises artificial graphite and a silicon-based material;

the second negative electrode coating layer is disposed on a surface of the first negative electrode coating layer and comprises a second negative electrode active material, and the second negative electrode active material comprises artificial graphite and a silicon-based material;

the silicon-based material is present at a mass percentage denoted as W1 in the first negative electrode active material, the silicon-based material is present at a mass percentage denoted as W2 in the second negative electrode active material, and the negative electrode plate satisfies: W2>W1 and W1+W2≤6%; and the silicon-based material comprises a first silicon-based material and a second silicon-based material, and the first silicon-based material has a particle size smaller than that of the second silicon-based material and the first silicon-based material has a particle size of greater than 0.05 μm and less than 7 μm; and the second silicon-based material has a particle size of greater than 7 μm and less than 15 μm.

2. The secondary battery according to claim 1, wherein 0%<W2≤6%.

3. The secondary battery according to claim 1, wherein 0%<W1≤3%.

4. The secondary battery according to claim 1, wherein the first negative electrode active material comprises natural graphite.

5. The secondary battery according to claim 1, wherein the artificial graphite is present at a mass percentage of ≥50% in the first negative electrode active material.

6. The secondary battery according to claim 1, wherein the first negative electrode active material comprises primary particles, and the primary particles have a quantity percentage of from 80% to 100% in the first negative electrode active material.

7. The secondary battery according to claim 1, wherein the second negative electrode active material comprises secondary particles, and the secondary particles have a quantity percentage of ≥50% in the second negative electrode active material.

8. The secondary battery according to claim 1, wherein the first negative electrode active material has a volume average particle size $D_v50$ greater than that of the second negative electrode active material.

9. The secondary battery according to claim 1, wherein the first negative electrode active material has a volume average particle size $D_v50$ of from 12 μm to 18 μm; and/or, the second negative electrode active material has a volume average particle size $D_v50$ of from 9 μm to 15 μm.

10. The secondary battery according to claim 1, wherein the silicon-based material comprises one or more of an elemental silicon, a silicon-oxygen compound, a silicon-carbon composite, a silicon-nitrogen compound, and a silicon alloy.

11. The secondary battery according to claim 1, wherein the negative electrode film further satisfies one or more of the following (1) to (5):
(1) the negative electrode film has an areal density of from 8 mg/cm² to 13 mg/cm²;
(2) the negative electrode film has a compaction density of from 1.4 g/cm³ to 1.7 g/cm³;
(3) the second negative electrode coating layer has a porosity greater than that of the first negative electrode coating layer;
(4) an areal density ratio of the first negative electrode coating layer to the second negative electrode coating layer is from 2:3 to 3:2;
(5) a thickness ratio of the first negative electrode coating layer to the second negative electrode coating layer is from 4:6 to 7:3.

12. The secondary battery according to claim 1, wherein the secondary battery comprises a positive electrode plate, the positive electrode plate comprises a positive electrode current collector and a positive electrode coating layer disposed on at least one surface of the positive electrode current collector, and the positive electrode coating layer comprises a positive electrode active material, and the positive electrode active material comprises one or more of a lithium transition metal oxide, a lithium-containing phosphate with an olivine structure, and modified compounds thereof.

13. An apparatus, comprising the secondary battery according to claim 1.

14. The secondary battery according to claim 1, wherein W1+W2≤3%.

15. The secondary battery according to claim 1, wherein the negative electrode film further satisfies one or more of the following (1) to (5):
(1) the negative electrode film has an areal density of from 9 mg/cm² to 12.5 mg/cm²;
(2) the negative electrode film has a compaction density of from 1.5 g/cm³ to 1.65 g/cm³;
(3) the second negative electrode coating layer has a porosity greater than that of the first negative electrode coating layer;
(4) an areal density ratio of the first negative electrode coating layer to the second negative electrode coating layer is from 2:3 to 3:2;
(5) a thickness ratio of the first negative electrode coating layer to the second negative electrode coating layer is from 4:6 to 7:3.

16. The secondary battery according to claim 1, wherein the positive electrode active material comprises one or more of the lithium transition metal oxide shown in formula 1 and modified compounds thereof,

$$Li_aNi_bCo_cM_dO_eA_f \qquad \text{formula 1,}$$

in the formula 1, 0.8≤a≤1.2, 0.5≤b<1, 0<c<1, 0<d<1, 1≤e≤2, 0≤f≤1, M is one or more selected from Mn, Al, Zr, Zn, Cu, Cr, Mg, Fe, V, Ti and B, and A is one or more selected from N, F, S and Cl.

17. The secondary battery according to claim 1, wherein the first negative electrode active material comprises primary particles, and the primary particles have a quantity percentage of ≥60% in the first negative electrode active material.

18. A process for preparing a secondary battery, comprising preparing a negative electrode plate of the secondary battery by the following steps:
forming a first negative electrode coating layer comprising a first negative electrode active material on at least one surface of a negative electrode current collector, wherein the first negative electrode active material comprises artificial graphite and a silicon-based material;
forming a second negative electrode coating layer comprising a second negative electrode active material on a surface of the first negative electrode coating layer, wherein the second negative electrode active material comprises artificial graphite and a silicon-based material;

wherein the silicon-based material is present at a mass percentage denoted as W1 in the first negative electrode active material, the silicon-based material is present at a mass percentage denoted as W2 in the second negative electrode active material, and the negative electrode plate satisfies: $W2>W1$ and $W1+W2 \leq 6\%$; and the silicon-based material comprises a first silicon-based material and a second silicon-based material, and the first silicon-based material has a particle size smaller than that of the second silicon-based material and the first silicon-based material has a particle size of greater than 0.05 μm and less than 7 μm; and the second silicon-based material has a particle size of greater than 7 μm and less than 15 μm.

* * * * *